Sept. 13, 1927.  F. G. YOUNG, JR  1,642,187
LIGHT PROJECTOR
Filed March 26, 1926
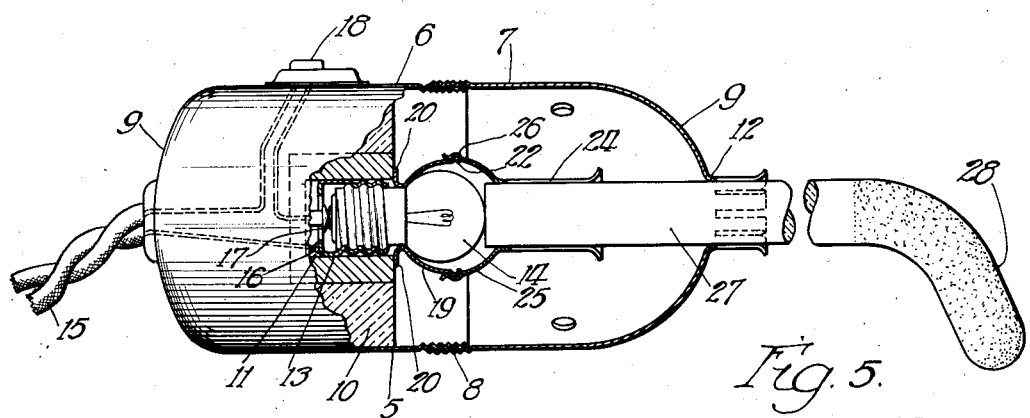
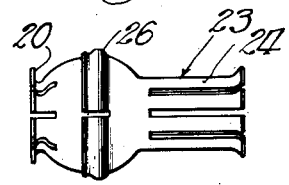
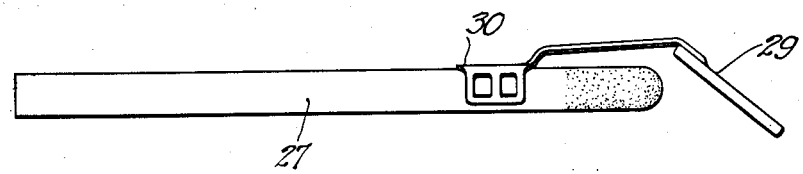
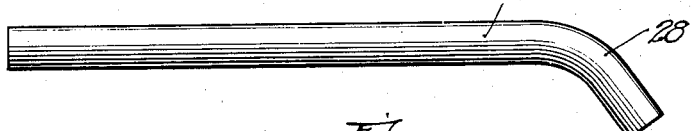
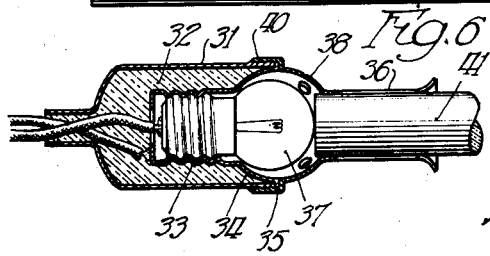
Inventor
Frank G. Young, Jr.
George E. Mueller, Atty.

Patented Sept. 13, 1927.

1,642,187

UNITED STATES PATENT OFFICE.

FRANK G. YOUNG, JR., OF CHICAGO, ILLINOIS, ASSIGNOR OF ONE-FOURTH TO ARTHUR C. MESSNER, OF CHICAGO, ILLINOIS.

LIGHT PROJECTOR.

Application filed March 26, 1926. Serial No. 97,543.

My invention relates to light projectors, and its principal object is to provide a light projector for use in small or restricted areas.

A further object of my invention is to provide a light projector to be used in examining parts of the human body, and may be placed in contact with the latter without burning or otherwise endangering the person.

The invention also contemplates a light projector or lamp capable of being inserted within the human mouth to illuminate the same without any danger whatsoever of injuring the person incident to burning or breaking of the usual illuminating bulb.

Still another object of the present invention resides in the provision of a refractory medium arranged to conduct the light rays to a point remote from the light source without the loss of divergent light rays, and thereby produce a bright, concentrated, luminous field at such remote point.

It is another object of the invention to provide a dental or surgical lamp wherein the light source is located at a distance from the patient, thus obviating all danger to the latter incident to burning or breaking of the usual electric bulb, and at the same time focusing the light rays directly upon the area to be inspected.

Further, the invention provides a light projector of this character which may be conveniently employed as a dental protractor in drawing the mouth and cheek to one side in order to conveniently view the interior of the latter.

On the drawings,—

Fig. 1 is a view, partly in elevation and partly in section, of a light projector constructed in accordance with my invention;

Fig. 2 is an elevation of the light-projecting rod embodied in the invention and a dental mirror supported on the latter;

Fig. 3 is an elevation of a modified form of light-projecting rod;

Fig. 4 is a similar view of another type of light-projecting rod;

Fig. 5 is an elevation of the combined light reflector and light-projecting rod holder; and Fig. 6 is a longitudinal sectional view of a modified light and reflector holder.

Referring to the drawing in detail, wherein corresponding characters of reference denote corresponding parts in the several views, the numeral 5 designates a conveniently sized and shaped shell constructed from sheet metal. As illustrated in Fig. 1, this shell comprises cylindrical sections 6 and 7 having their inner ends detachably engaged through the medium of screw threads 8. The opposite ends of the shell are rounded, as at 9, to give the latter a neat appearance.

A non-conducting body 10 of suitable plastic material is held within the section 6, and is formed with a central recess 11 that is disposed concentrically with relation to a resilient sleeve 12 formed with the outer end of the section 7. A conventional electric bulb socket 13 is accommodated and secured within the recess 11 to receive a conventional illuminating bulb 14. Suitable electricity conductors 15 pass through the outer end of the section 6 and the non-conducting base 10. One of these conductors 15 is connected to the lamp base in a conventional manner, as indicated at 16, while the other conductor is electrically connected with the usual central or lamp-base engaging contact 17. An electric switch 18 is carried by one side of the section 6 and is electrically connected with the last mentioned conductor 15, as illustrated.

A reflector 19 is received on the bulb 14 and has its inner end formed with resilient clamping fingers 20, the ends of which are laterally extended and secured to the base 10 by fastenings 21. The forward edge of the reflector 19 is formed with a circumferential bead 22. Arranged concentrically to the bulb 14 and sleeve 12 is a sleeve 23 formed with parallel, resilient fingers 24 having their outer ends laterally curved or flared. This sleeve 23 has its inner end formed with a semispherical member 25 which extends around the bulb 14 and coacts with the reflector 19 in confining the light. This member 25 is formed with an internal, circumferential depression 26 which resiliently engages the bead 22.

For the purpose of projecting the light rays to a point remote from the light 14, I provide a clear, transparent rod preferably 27 having parallel surfaces. In connection with the glass rod 27, it is pointed out that while any desired character of glass may be employed, it is preferred to use glass which is clear-selected, heat-resisting and possesses the desired strength. This rod 27 extends through the section 7, with its inner end received in and held by the sleeve 23 and an intermediate point passed through and engaged by the sleeve 12. By arranging the glass rod in this manner, the ray of the light from lamp 14 will be projected in a true longitudinal direction through to the end of the rod without any of the divergent rays passing from the sides of the rod.

I preferably arrange the lighting bulb a distance from the adjacent end of the rod so that the rays from the bulb are all retained in the rod and find that for this purpose the ordinary small bulb placed in contact with the end of the rod will properly direct the rays.

As shown in Fig. 1, the forward end of the rod 27 is offset or arranged at an oblique angle, to afford an illuminated dental protracter 28. The exterior of the protracter element 28 and the adjacent part of the rod 27 are ground so as to reflect a diffused light. With the glass rod constructed in this manner the patient's cheek can be conveniently pulled to one side and the interior of the mouth illuminated at the same time.

However, with the types of glass rods disclosed in Figs. 2, 3 and 4, the rays will be projected directly from the tip or outer extremity of the rod and produce a concentrated light at this point.

Sometimes it will be necessary to inspect the state of tissue and for this purpose it is desirable to project a red ray upon the field of tissue to be illuminated. In order to provide for the projection of a red ray, the inner end of the rod 27 will be colored red.

In lieu of coloring the inner end of the rod 27, a red disk may be interposed between the light bulb 14 and the rod. Also instead of providing the ground surface on the protracter 28, the latter may be dipped in hydrofloric acid to obtain a roughened surface for diffusing the light ray. In connection with the curved protracter 28 it is pointed out that it may be straight if desired. That is, the illuminated tip of the rod 27 may be employed as a protracter.

I also contemplate using rods of the character shown but silvered on the outer surface, as there may be occasions where this is desirable. Furthermore, I contemplate shielding the outer surface of the rod with an opaque covering so as to prevent any of the light escaping from the side of rod, this being desirable for some inspections. For the latter purpose I may employ a copper, silver, rubber or other sheathing.

As illustrated in Fig. 2, it is convenient to mount a dental mirror upon the illuminated end of the rod. The dental mirror is designated at 29, and is arranged at an oblique angle with respect to the longitudinal axis of the rod, and carries the usual resilient clip 30 embracing the rod. With the mirror arranged in this manner, the light rays will be projected from a single reflecting surface in the desired direction.

Fig. 6 discloses a modification of the invention, and in this instance a shell 31 open at its forward end is provided. Arranged centrally within the shell and held in a plastic core 32 is a threaded sleeve 33 having its forward end formed with a reflector 34, the latter terminating in a marginal annular flange 35 which rests against the forward end of the shell 31. A relatively long, bifurcated sleeve 36 extends concentric to the electric lamp or bulb 37 threaded in the sleeve 33. The inner end of the sleeve 36 is formed with a semispherical member 38, which surrounds the bulb 36 and has its outer edge contacting with the outer edge of the reflector 34. A thimble 39 is formed with the inner end of the semispherical member 37 and is detachably engaged with the shell 31 by means of screw threads 40. The light-projecting rod 41 is received in the bifurcated sleeve 35, with its inner end abutting the bulb 37. In this instance the conductors 15 are connected to the base of the bulb 37 and to the threaded sleeve 33, respectively, and in order to control the flow of electricity through these conductors a conventional switch (not shown) will be associated therewith.

The parallel surfaces of the rod act as reflecting surfaces for the light rays and confines them within the rod. These surfaces may be either the highly polished exterior of the rod, silvering or otherwise coating the exterior of the rod, as above stated.

What I claim as my invention and desire to secure by Letters Patent of the United States is:

1. A light projector for denture illumination including a handle consisting of a metallic two piece cupped casing removably secured together at the open ends, a light bulb carried in one of the cup portions, and a glass rod light projector supported with one end adjacent the end of the bulb and extending through and supported by the other cup portion.

2. A light projector for denture illumination including a handle consisting of a suitable elongated casing, a light bulb carried in said casing, a metallic reflector surrounding the bulb from the rear to a continuing front light projector holder, and a glass rod light projector supported by the holder with one end of the rod adjacent the end of the bulb.

3. A light projector for denture illumination including a handle, a light bulb therein, a solid glass light projecting rod held by the handle in operative relation to the bulb, said rod having a polished surface throughout its length with a roughened surface light diffusing end.

4. A light projector for denture illumination including a handle having a light bulb therein, a light projecting glass rod, and means for longitudinally adjustably supporting the rod by the handle for permitting contact between the end of the bulb and an end of the glass rod.

5. A light projector for denture illumination including a handle having a light bulb therein and a light projecting glass rod extending therefrom, and a reflecting mirror positioned beyond the light projecting end of the rod and having a supporting bracket slidably clamping the rod for longitudinal adjustment thereon.

In witness whereof, I hereunto subscribe my name this 17th day of March, 1926.

FRANK G. YOUNG, Jr.